No. 811,994. PATENTED FEB. 6, 1906.
J. C. BARCLAY.
TELEGRAPH TRANSMITTER.
APPLICATION FILED FEB. 27, 1905.
7 SHEETS—SHEET 5.
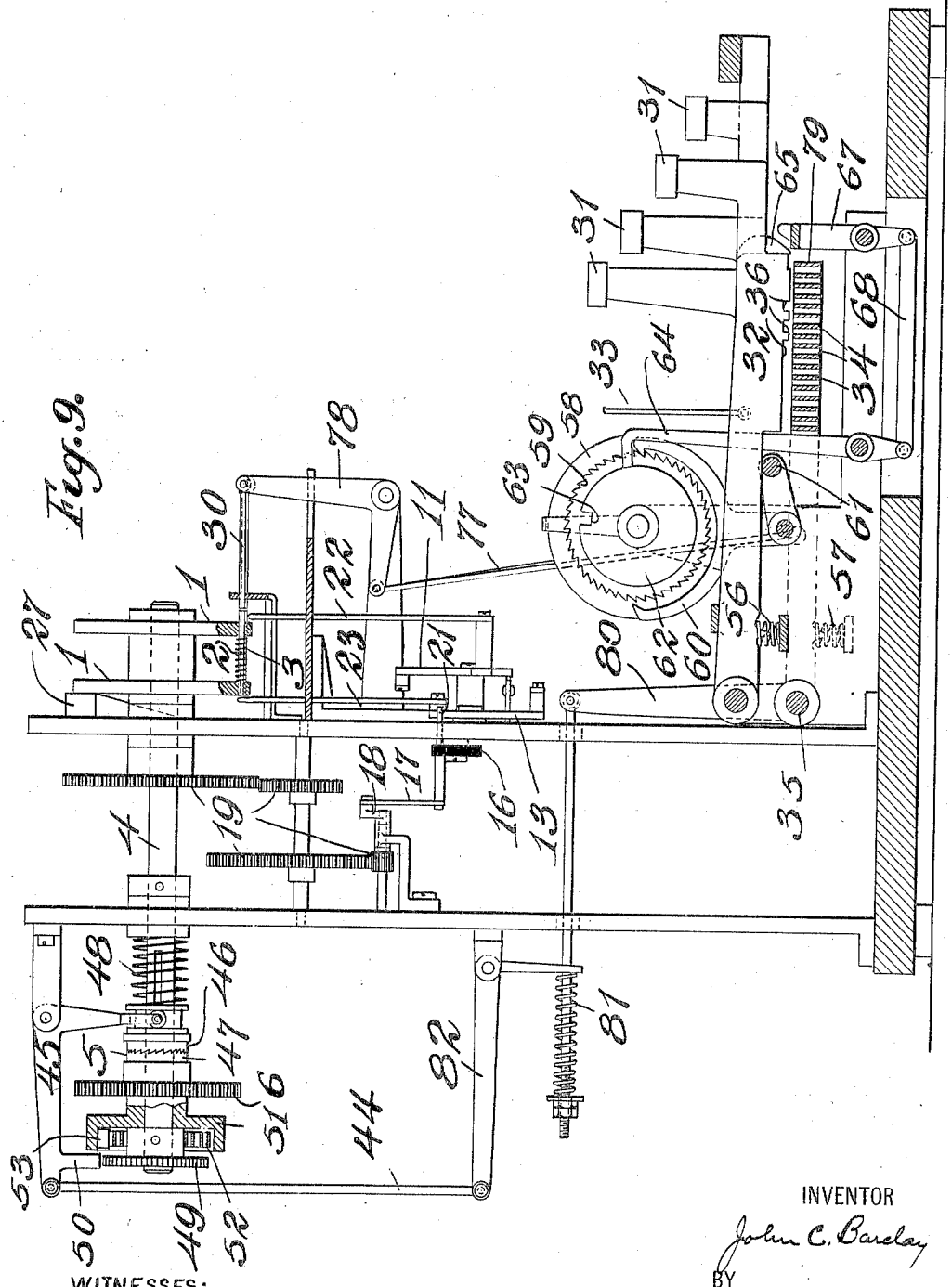
WITNESSES:
INVENTOR
John C. Barclay
BY
H. M. Marble
ATTORNEY

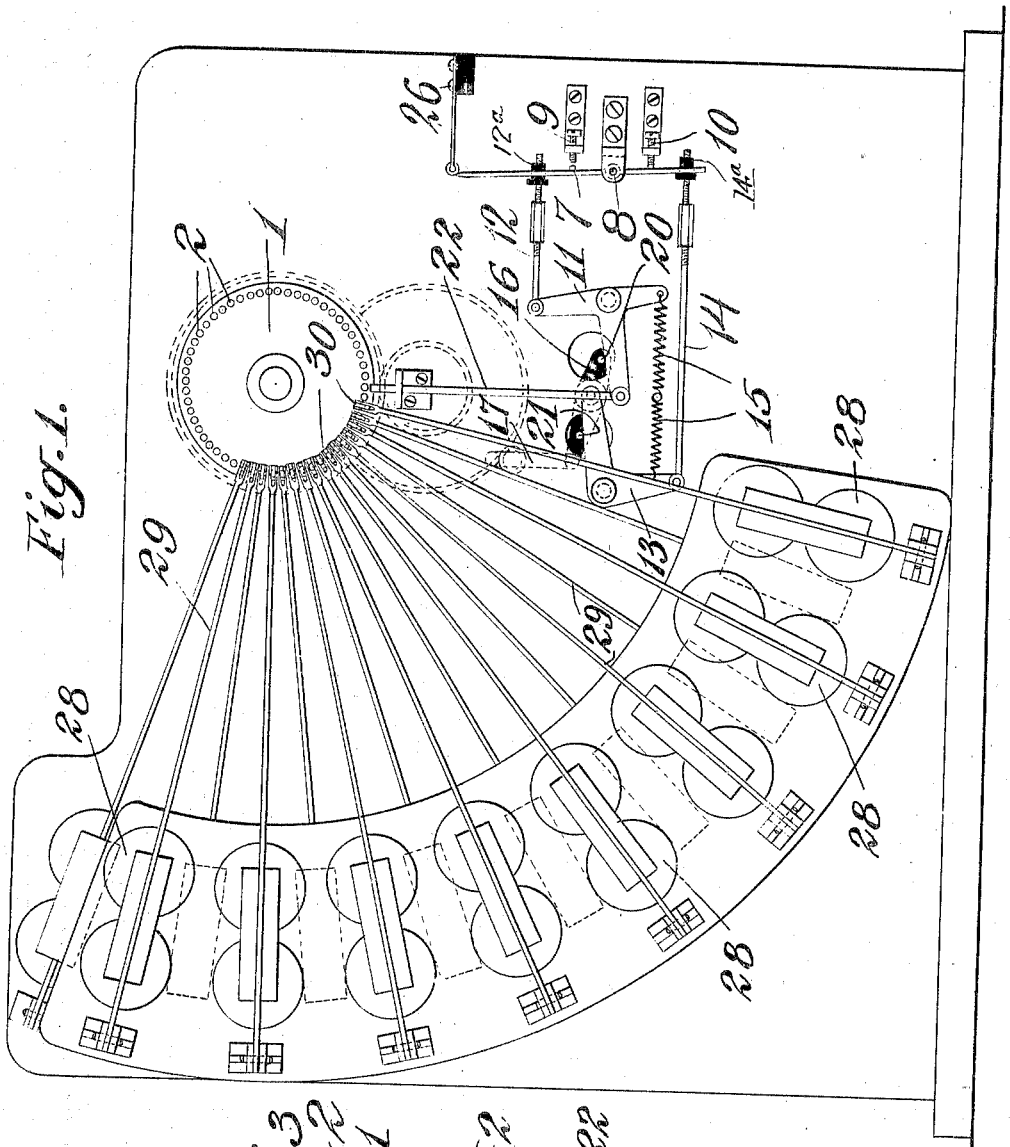

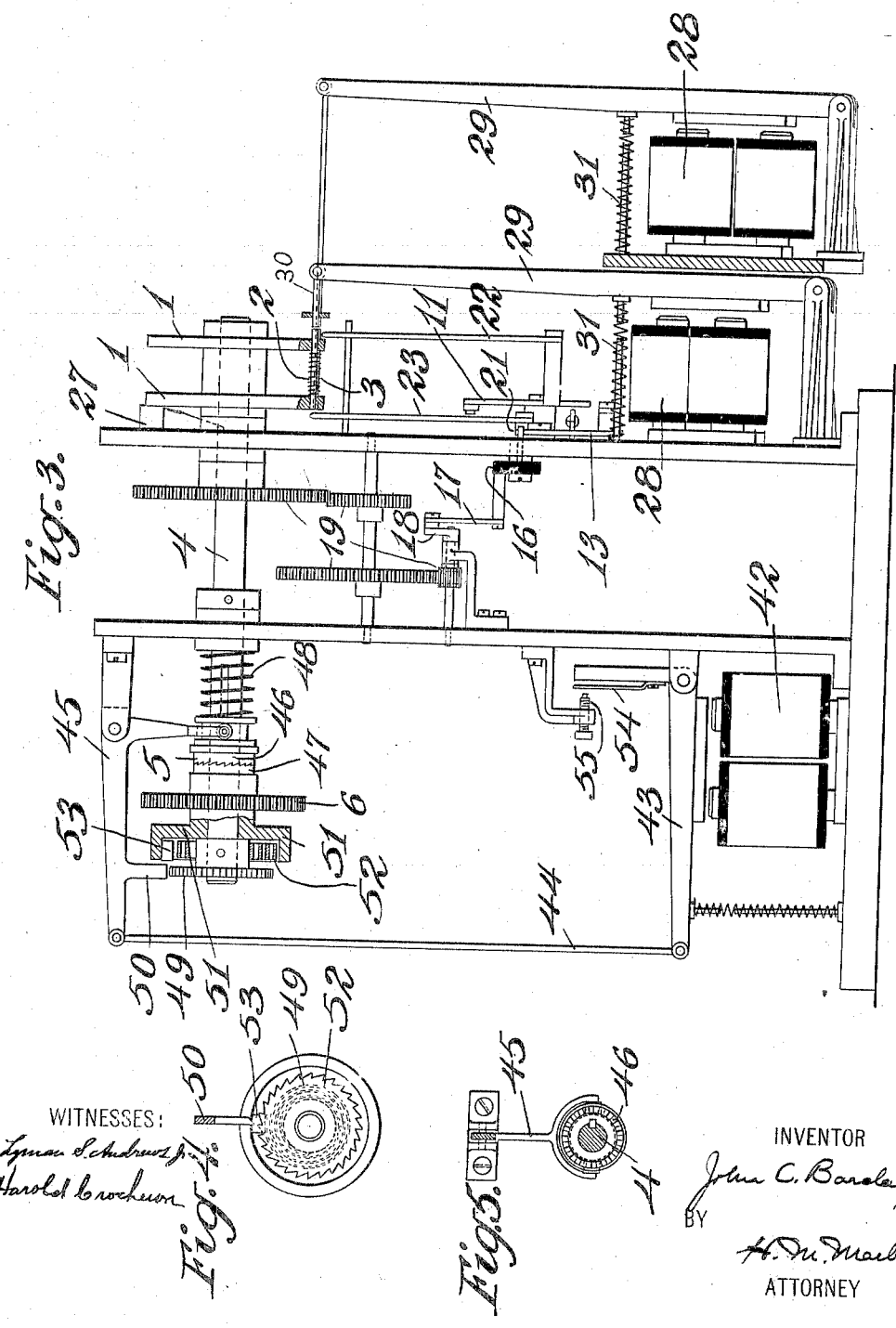

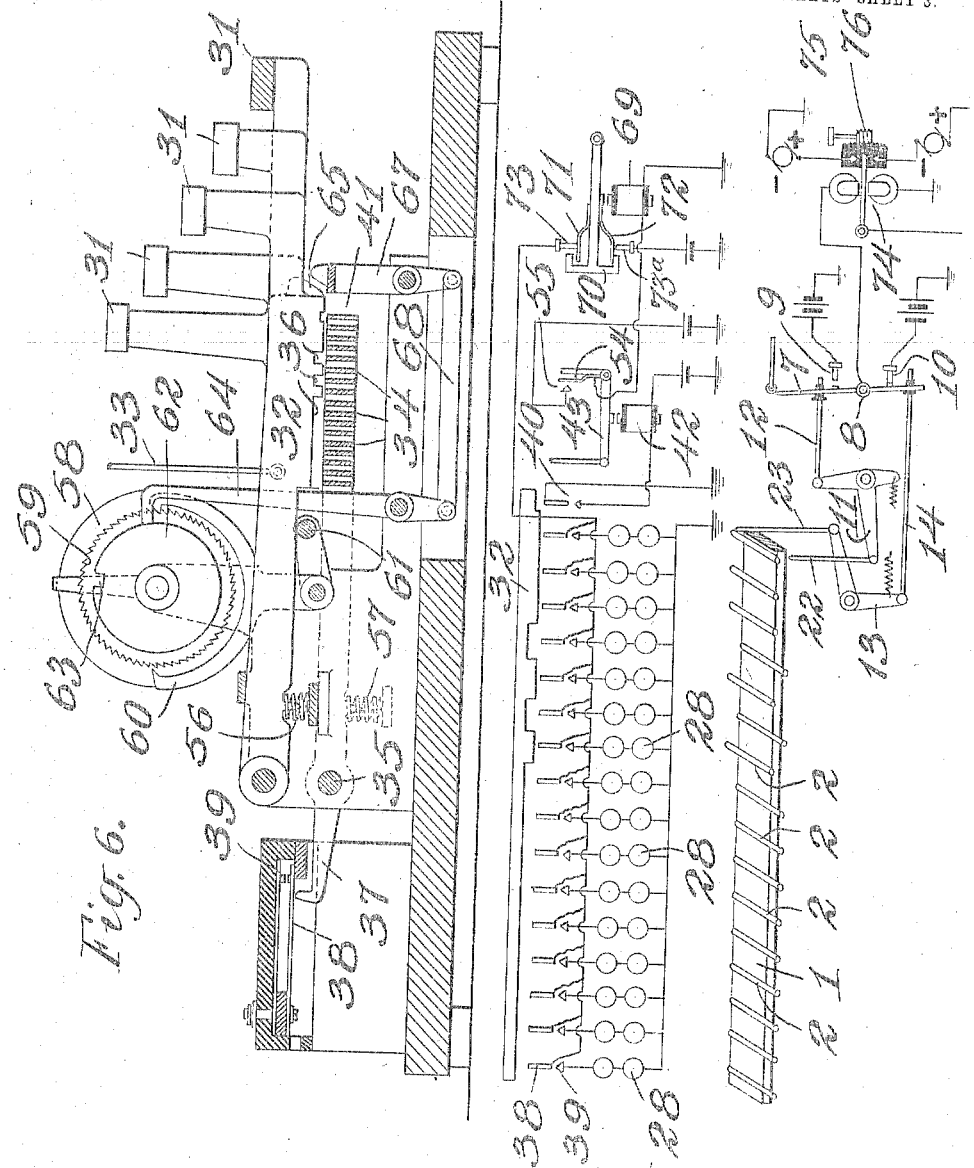

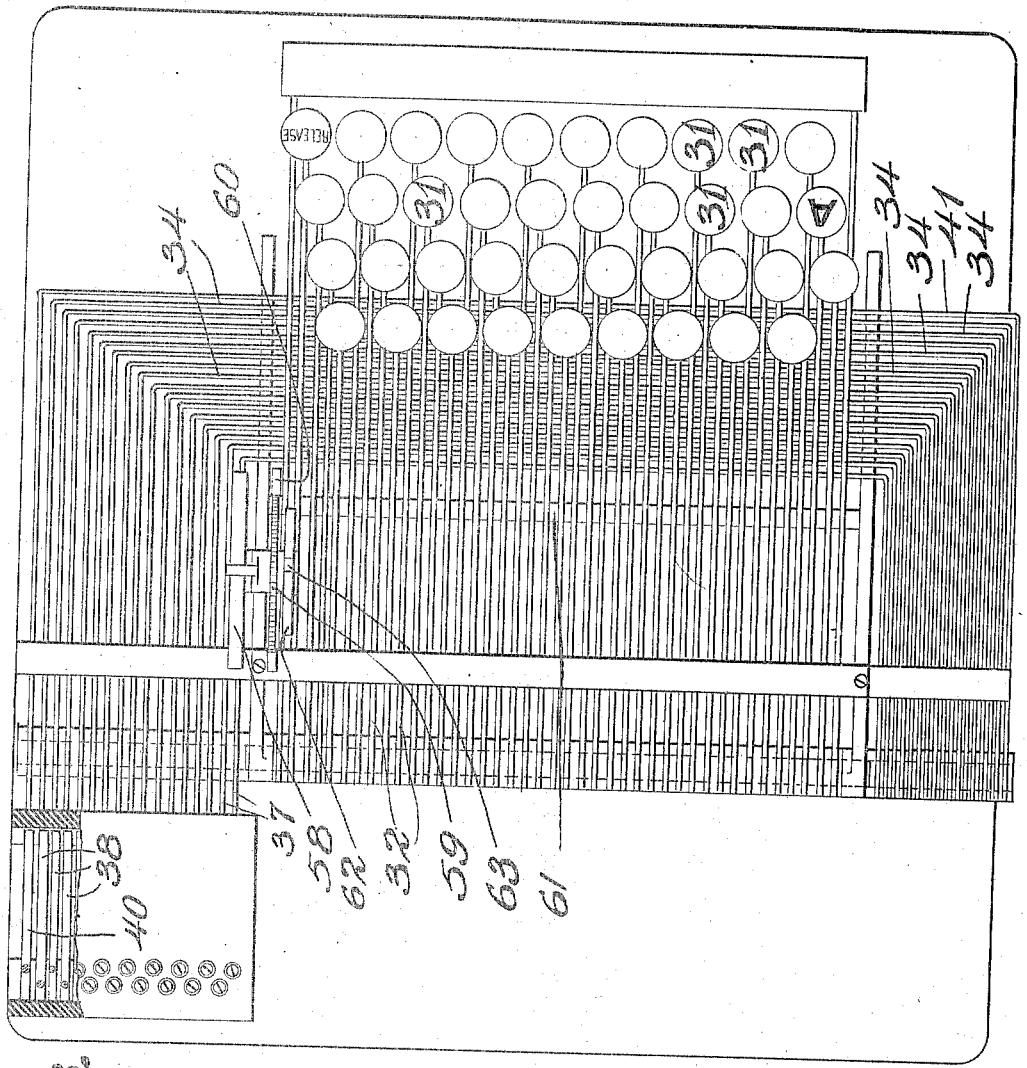

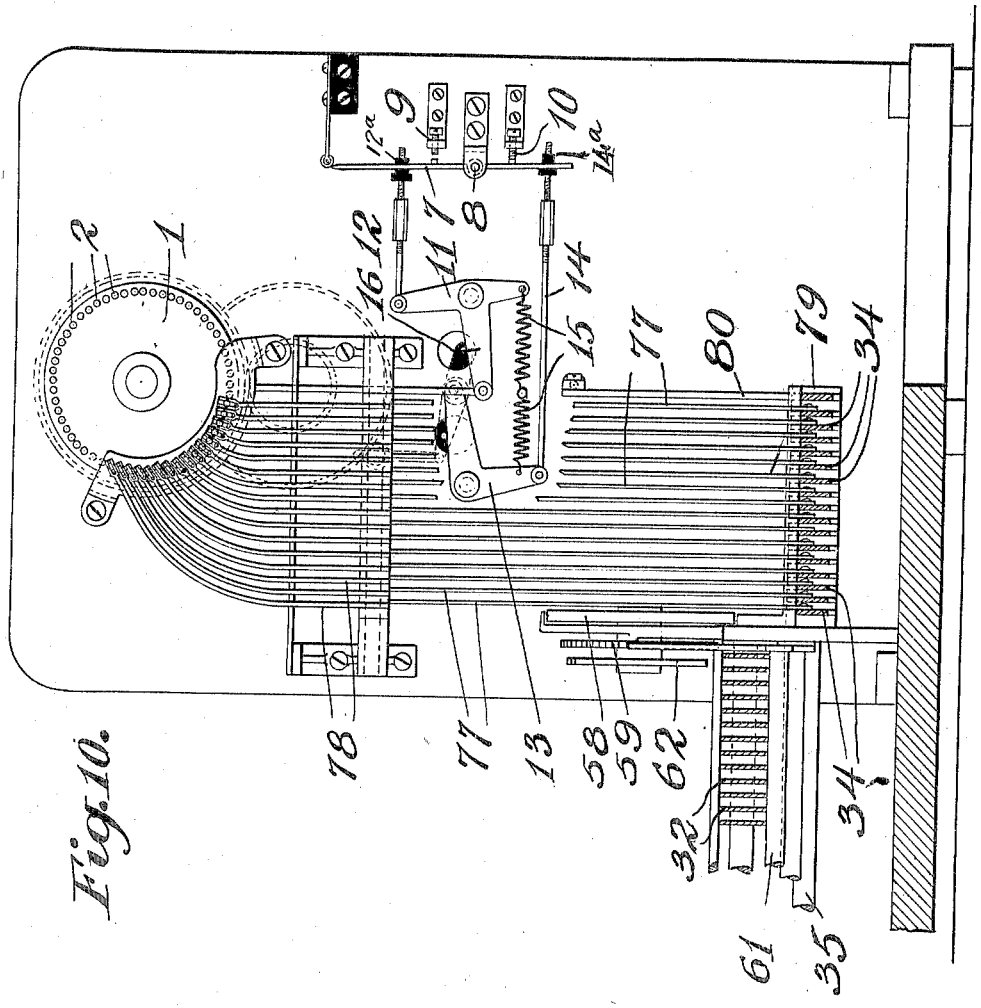

No. 811,994.
PATENTED FEB. 6, 1906.
J. C. BARCLAY.
TELEGRAPH TRANSMITTER.
APPLICATION FILED FEB. 27, 1905.
7 SHEETS—SHEET 7.
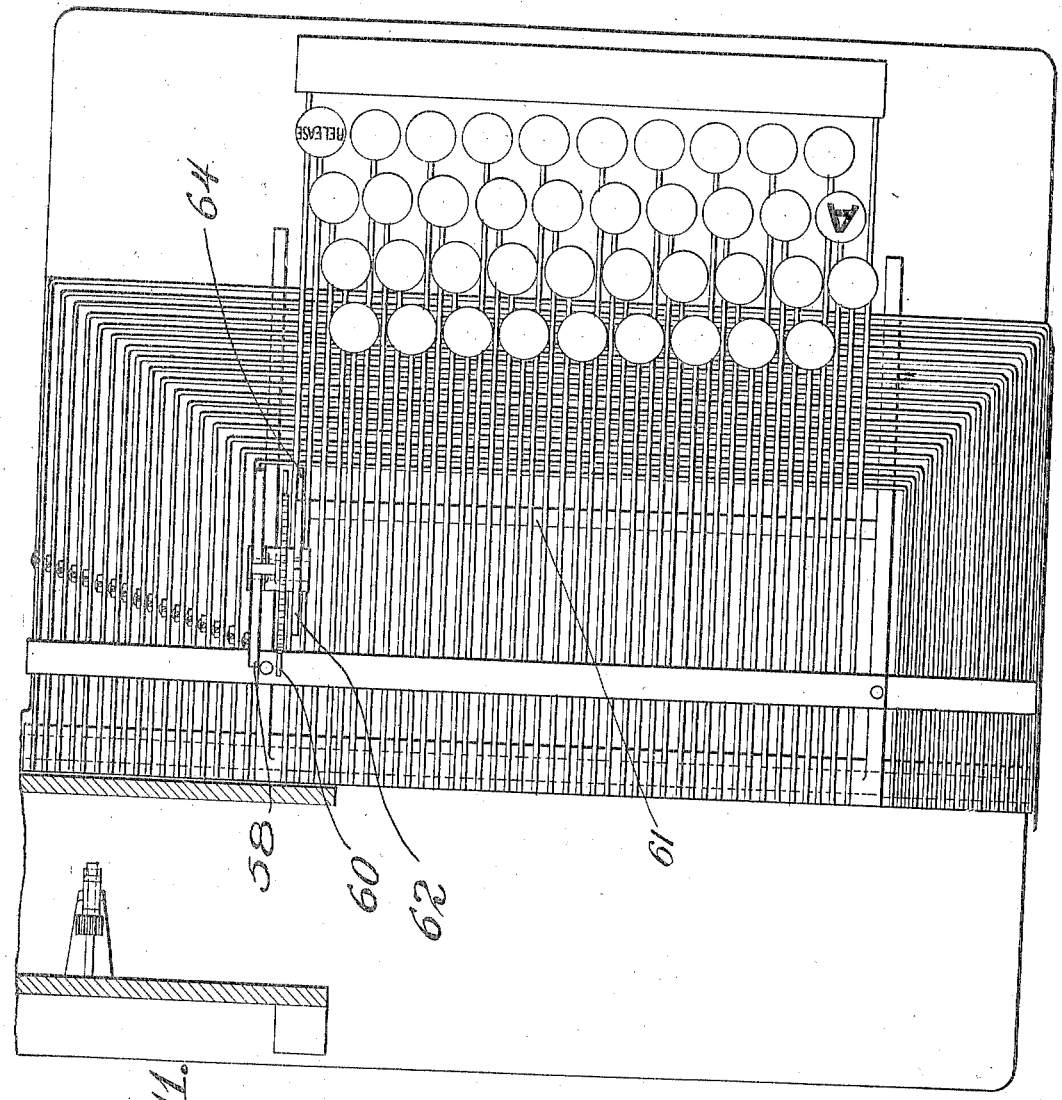
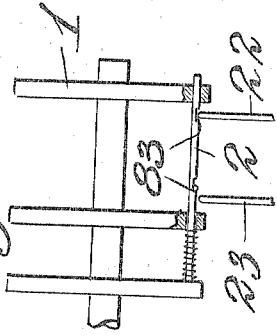
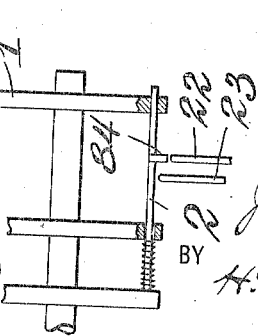
WITNESSES
INVENTOR
John C. Barclay
BY
H. M. Marble
ATTORNEY

UNITED STATES PATENT OFFICE.

JOHN C. BARCLAY, OF NEW YORK, N. Y., ASSIGNOR TO WESTERN UNION TELEGRAPH COMPANY, OF NEW YORK, N. Y., A CORPORATION OF NEW YORK.

TELEGRAPH-TRANSMITTER.

No. 811,994.   Specification of Letters Patent.   Patented Feb. 6, 1906.

Application filed February 27, 1905. Serial No. 247,462.

*To all whom it may concern:*

Be it known that I, JOHN C. BARCLAY, a citizen of the United States, residing at New York, in the county of New York and State of New York, have invented certain new and useful Improvements in Telegraph-Transmitters; and I do hereby declare the following to be a full, clear, and exact description of the invention, such as will enable others skilled in the art to which it appertains to make and use the same.

My invention relates to improvements in telegraph-transmitters, and particularly to improvements in keyboard telegraph-transmitters wherein a series of keys marked according to the various characters to be transmitted telegraphically are arranged to operate means whereby when each key is operated the corresponding character is transmitted.

The particular keyboard-transmitter herein illustrated is particularly intended for use in connection with a page-printing telegraph-printer—such, for example, as illustrated and described in my Patent No. 787,608, dated April 18, 1905; but my invention is not limited to use in connection with printing-telegraphs or to any particular code of transmission, but is applicable for telegraphic transmission generally and may transmit according to any code desired.

My improved keyboard telegraph-transmitter herein illustrated and described comprises a plurality of adjustable stops or circuit-controlling devices adjustably mounted in a moving carrier and arranged to be adjusted in position according to the character to be transmitted, so as to represent physically that character, and the transmitter further comprises contact mechanism arranged to be operated variably according to the variable adjustment of said stops or circuit-controlling devices, so as to transmit the different signals.

My invention consists in novel and improved means, as hereinafter described, for operating the transmitting contact mechanism variably according to the character to be transmitted and in many other features of invention hereinafter more particularly described, and pointed out in the claims.

The objects of my invention are to improve and simplify keyboard telegraph-transmitters, to render the same certain and rapid in operation, to adapt the same for the employment of approved types of transmitting contact mechanism, to avoid unnecessary delay between characters transmitted, and to make the machine easy to operate, easy to inspect and keep in order, simple, rapid in operation, and relatively inexpensive.

I will proceed to describe my invention with reference to the accompanying drawings, which illustrate two forms of transmitters embodying my invention, in one of which the stops or circuit-controlling devices are adjusted through the action of electromagnets and in the other of which the said stops are adjusted mechanically, and will then point out the novel features in claims.

In the said drawings, Figure 1 shows a front view of the transmitter proper of the magnetically-operated machine separate from its controlling-keyboard. Fig. 2 shows a detail side view of the revolving carrier and adjustable stops or circuit-controlling devices of said transmitter, part of the stops being omitted. Fig. 3 shows a side view and partial section of such transmitter proper detached from its keyboard, only one of the stops and only two of the adjusting-magnets being shown. Fig. 4 shows a detail end view of the locking-disk and associated parts of said transmitter. Fig. 5 shows a detail section through the clutch of said transmitter. Fig. 6 shows a side view and partial section of one form of keyboard which may be employed in my transmitter. Fig. 7 is a diagram showing the electrical connections of my transmitter shown in Figs. 1 to 6, inclusive. Fig. 8 shows a top view of the keyboard shown in Fig. 6. Fig. 9 is a view similar to Fig. 3 of the mechanically-operated transmitter wherein there are direct mechanical connections between the key-levers and the pushers which adjust the stops or circuit-controlling devices. Fig. 10 shows a front view of said mechanically-operated transmitter. Fig. 11 shows a top view of the keyboard of said mechanically-operated transmitter, the other portions of the instrument having been removed. Figs. 12 and 13 are detail side views of the drum or carrier 1, illustrating alternative arrangements of the stops.

Referring now to the drawings and at first to Figs. 1 to 5 thereof, showing the transmitter proper, numeral 1 indicates a revoluble drum or carrier provided near its periphery with a circular row or series of adjustable stops or circuit-controlling devices 2, arranged longitudinally and each surrounded by a light spiral spring 3, the only function of which is to retard slightly by friction longitudinal motion of the stop. Said stops are longitudinally movable with respect to the drum 1, and normally they project slightly at the front of the drum, their rear ends being substantially flush with the rear surface of the drum. By means hereinafter described as many as desired of these stops may be pressed in or back to constitute a physical reproduction of each character to be transmitted. Fingers controlling the operation of the transmitting contact mechanism are permitted to or prevented from operating, according to the adjustment of these stops, as hereinafter described. Drum 1 is arranged to be rotated, being mounted upon a shaft 4, arranged to be driven through a clutch 5 by a gear-wheel 6. Any suitable means may be employed for driving gear 6, such as an electric motor, a weight, a spring, &c. I do not illustrate and do not limit myself to any particular type of motor for the purpose.

The contact mechanism for transmitting the signals which I prefer to use is similar to that of the well-known Wheatstone automatic transmitter, but is not controlled by a perforated tape, as in the Wheatstone instrument, the drum 1 and its stops serving in lieu of a perforated tape. Said contact mechanism (shown particularly in Figs. 1 and 3) comprises a pivoted contact-arm 7, pivoted at 8 and arranged to make contact alternately with stops 9 and 10. These stops and the central pivot 8 constitute circuit-terminals, and these circuit-terminals, with the contact-arm 7, will be recognized as constituting a familiar arrangement of contact-points commonly employed in polar transmitters used with dynamo-currents. For vibrating the pivoted arm 7 bell-cranks 11 and 13, connected by adjustable links 12 and 14 to opposite sides of arm 7, are provided. Links 12 and 14 have sliding connections with contact-arm 7, ivory bushings 12ª and 14ª on these links sliding freely through bearing-orifices in said arm, thus permitting some lost motion. Springs 15 act upon the bell-cranks, tending to cause each bell-crank to move the contact-arm 7 toward the corresponding contact-stop 9 or 10. Motion of the bell-cranks is produced, however, by the action of a vibrating rocker 16, arranged to be rocked by a link 17 and crank 18, the latter driven by suitable gearing 19 from shaft 4. Said rocker carries pins or fingers 20 and 21, engaging arms of the bell-cranks 11 and 13, as shown, the rate of oscillation of rocker 16 being the same as the rate of passage of the stops 2 past a given point during the rotation of drum 1.

Each time the right-hand end of rocker 16 rises spring 15 tends to cause bell-crank 11 and link 12 to move contact-arm 7 into contact with stop 9, and each time the left-hand end of rocker 16 rises spring 15 tends to cause bell-crank 13 to move contact-arm 7 into contact with stop 10. The movement of the bell-cranks and contact-arms 7 is determined by the adjustment of the stops 2 through the agency of pins 22 and 23, carried by bell-cranks 11 and 13, respectively, and guided so as to move substantially vertically. Pin 22 is just beneath the ends of stops 2 as they project in their normal positions from the front of drum 1, and pin 23 is just beneath the rear ends of stops 2 when said stops project at the rear, owing to being pushed in from the front. In the normal adjustment of stops 2, in which said stops all project to the front, pin 22 cannot rise materially during the reciprocation of the rocker 16, upward movement of said pin being prevented by the projecting ends of stops 2, and therefore contact-arm 7 is stationary, normally in the position indicated in Fig. 1, in contact with stop 10; but when, as pin 22 starts to rise, the stop 2 opposite the end of such pin at that instant has been pressed in, said pin 22 continues to rise, causing the contact-arm 7 to shift into contact with stop 9, so initiating a signal. Said signal will be short or long—i. e., will be a dot or a dash—according as one or a plurality of adjacent stops 2 have been pressed in. If only one stop has been pressed in, then when rocker-arm 16 causes pin 22 to move downward upward motion of pin 23 will not be blocked through the projection of the end of the next adjacent stop 2 from the rear of drum 1, and pin 23 will rise, moving contact-arm 7 back into contact with stop 10 and terminating the signal, which will thus be of minimum length—viz., a dot; but if, say, three adjacent stops 2 have been pressed in at its first attempt pin 23 will be prevented from rising by the projecting rear end of the second of the stops so pressed in, and it will not be until the fourth stop, counting from the first stop pressed in, is opposite pin 23 that the latter can rise and reverse the position of contact-arm 7. It will be obvious, therefore, that when three adjacent stops are pressed in the contact-arm 7 remains in contact with stop 9 longer than when only one stop is pressed in. Similarly, if five adjacent stops are pressed in a still longer signal will result.

It is not essential that a single stop 2 pressed in shall represent a dot and three stops pressed in shall represent a dash. A plurality of stops—as, for example, three—may be employed to transmit a dot and a still higher number a dash, and the dashes and the intervals between the dots and dashes may be of varying lengths. It will be noted that the stops 2 when adjusted to produce the dots and dashes of a character of a telegraphic code in effect constitute a physical representation of that character.

A jockey 26 tends to hold contact-arm 7 in either of its extreme positions, and so overcomes the tendency of the friction of bushings 12ª and 14ª when sliding through the contact-arm to shift said arm improperly.

The drum 1 is shown as provided with more stops or circuit-controlling devices 2 than will be required for any one character of any of the telegraph-codes commonly used. All of the stops required for any one telegraph character are adjusted simultaneously either by electromagnetic means, as illustrated in Figs. 1 and 3, or by mechanical means directly actuated by the key-levers, as illustrated in Figs. 9 and 10, and while the stops are being adjusted in position to make the desired character the rotation of the drum 1 is stopped momentarily through the opening of the clutch 5 and the operation of locking means hereinafter described. As soon as the adjustment of the stops is complete the rotation of the drum 1 begins again, and as the stops of the character to be transmitted pass the pins 22 and 23 they control the upward movement of said pins and the oscillation of the contact-arm 7 in such manner as to cause the transmission of the character represented by the adjustment of the stops. After each stop passes the pins 22 and 23 it encounters a resetting-cam 27, by which all of the stops which have been pressed in or back are pressed out again and are thus prepared to be adjusted for another character.

The means for adjusting or setting the stops 2 for the character to be transmitted (illustrated in Figs. 1 and 3) comprises magnets 28, arranged in two series in arcs of circles about the drum 1 and provided with armature-levers 29, arranged to actuate push-pins 30, suitably guided and arranged in the arc of a circle opposite the ends of stops 2. In the arrangement shown there are sixteen such magnets 28; but this number may be less or greater, according to the demands of the telegraphic code used. Suitable compression-springs 31 move back the armature-levers and push-pins 30 when their magnets are deënergized. The circuits of these magnets 28 are controlled by corresponding contacts of a keyboard. Figs. 6 and 8 illustrate one keyboard comprising finger-keys, contacts, and selecting mechanism determining which contacts are closed by the depression of the several keys. This keyboard mechanism, however, is only one of many which I may employ, and I do not limit myself to the use of the particular mechanism illustrated. Said keyboard mechanism comprises a plurality of finger-keys 31, carried each by a corresponding key-lever 32, and the finger-keys may be marked the same as the keys of a type-writer, each with the particular letter or character to which it corresponds. In fact, keys 31 and key-levers 32 may be the keys and key-levers of a type-writer, being provided with connections, such as 33, for operating the printing and other mechanism of a type-writer in the ordinary manner. I do not illustrate the mechanism of any type-writer other than the keys, key-levers, and connections 33, as such mechanism forms no portion of my invention, and the selecting mechanism herein illustrated and described may be operated in the manner illustrated by the key-levers of most, if not all, of the well-known type-writers.

Beneath the key-levers 32 are a plurality of contact-operating levers or bails 34, pivoted at 35, and the key-levers are provided with a plurality of notches 36, corresponding in position to the bails 34, which said key-levers are not to actuate when depressed. Each key-lever is notched differently from all of the others, and therefore each key-lever when depressed actuates a characteristic combination of bails 34, and so energizes a characteristic combination of adjusting-magnets 28 and produces a characteristic adjustment of stops 2, constituting the combination of dots, dashes, spaces, &c., which make up the corresponding telegraphic character.

The particular type of contacts operated by the bails 34, illustrated in the drawings and which is only one of many which may be employed, consists of a projection 37, carried by the corresponding bail and arranged when it is raised by the depression of said bail to lift a spring contact-tongue 38 into contact with a contact-point 39.

In order to prevent premature actuation of the magnets 28, the circuits of said magnets are controlled by a master-contact closed by the depression of the finger-key after the various selecting contacts have all been closed. The master-contact 40 is exactly similar, except as to adjustment, to the several selecting contacts 37 38 39 and is operated by a bail 41, similar to the selecting-bails 34, which all of the key-levers actuate when depressed.

For operating the clutch 5, through which the drum 1 is driven, a magnet 42, Fig. 3, is provided. The armature 43 of this magnet is connected by a link 44 to a bell-crank lever 45, which actuates the sliding member 46 of the jaw-clutch 5, which member is splined to its shaft. The other member 47 of the clutch is in permanent driving connection with the main driving-gear 6. When the magnet 42 is energized, the clutch is opened, and, conversely, when the magnet is deënergized the clutch is closed by the action of spring 48. To arrest the drum 1 promptly and in the proper position, a locking-disk 49, fast to shaft 4, is provided, and lever 45 is provided with a tooth 50, arranged when said lever is depressed to open the clutch to enter one of the various notches in said locking-disk and arrest and center the drum 1. To aid in bringing the drum 1 to rest in proper position and to insure that it shall remain steady until shaft 4 is released and the clutch 5 closed, I further provide a friction-drag consisting of a flanged disk 51, driven by gear 6, and a spring 52 within the flange of said disk, one end of said spring secured to shaft 4, the other carrying a pad 53, which is pressed by said spring against the flange of disk 51.

The armature 43 of the clutch-magnet 42 carries a contact-spring 54, adapted when said armature is attracted to make contact with a stop 55. This contact 54 55 controls the circuits of the adjusting-magnets 28, as hereinafter described.

Springs 56 and 57 are provided for returning the key-levers 32 and selecting-bails 34 when released after being depressed.

When my improved transmitter is to be used in connection with printing-telegraphs of the page-printing type, I employ means for indicating when the end of the line is approached, so that the transmitting operator may operate the release or carriage-return key at the proper time. The indicating means for this purpose (illustrated in the drawings) consists of a wheel 58, upon the periphery of which may be any suitable scale or marks to indicate the position of the carriage of the receiving-printer and a mark to indicate the end of the line. This wheel is rotated by a ratchet-wheel 59, connected to it and arranged to be rotated step by step as the keys are operated successively by a ratchet 60, operated by a universal bar 61, which is beneath the key-levers and is depressed by each such lever when the latter is actuated. A locking-disk 62, likewise driven with the ratchet-wheel, is provided with a notch 63, which a locking-lever 64 enters when the end of the line is reached, thereby locking the keys, for since the ratchet-wheel 59 cannot move when the disk 62 is so locked, neither can the ratchet 60 and the universal bar 61, and the latter holds the key-levers from being depressed.

The return of the carriage of the receiving-printer is accomplished by the depression of a key marked "Release" in the representation of the keyboard, Fig. 8. Such key is arranged when depressed to operate a corresponding combination of selecting-bails 34, which will cause the transmission of a characteristic signal by which appropriate mechanism of the printer will be operated and the return of the carriage of the printer accomplished. This release-key is provided with a projection 65, Fig. 6, which encounters a lever 67 and presses it aside before said release-key, or, more properly, the key-lever thereof, encounters the universal bar 61. The lever 67 when so pressed aside operates locking-lever 64 through a link 68, releasing the disk 62, and then the release-key lever, encountering the universal bar 61, depresses the same, moving the indicating-wheel 58 forward one tooth to the mark corresponding to the beginning of the line.

In case the keyboard of my transmitter is the keyboard of a type-writer the indicating mechanism above described may be omitted, as the carriage of the type-writer and the indicator customarily provided in connection therewith serves the same purpose as the disk 62.

Referring now to the diagram Fig. 7, said diagram shows one key-lever 32 and beneath it the various selecting contacts 38 39, which are operated by the depression of the key-levers, together with the master-contact, which is operated by all of the key-levers. Said diagram also shows beneath the selecting contacts the corresponding adjusting-magnets 28, and beneath said magnets is shown in partial perspective a diagrammatic development of the drum or carrier 1, (which by development becomes a bar,) together with a number of the stops or circuit-controlling devices 2 carried thereby. The diagram further shows the clutch or stop-magnet 42 and the contact 54 55 operated thereby. As shown, the circuit of this clutch-magnet is closed by the closing of master-contact 40, and said clutch-magnet when its circuit is closed closes contact 54 55, and thereby operates a relay 69, controlling the circuits of the adjusting-magnets 28. The armature of said relay 69 has a T-head 70 and contact-springs 71 and 72, arranged to make contact with stops 73 and 73$^a$, respectively. Normally spring 71 and stop 73 are in contact and spring 72 and stop 73$^a$ are out of contact but soon after the armature of relay 69 when attracted begins to move contact is closed between 72 and 73$^a$, thereby closing circuit through the selecting contacts 38 39, which have been closed by the depression of the particular key-lever actuated, and through the corresponding adjusting-magnets 28. Before the armature of relay 69 has ended its movement contact between 71 and 73 is broken by the T-head 70, pulling spring 71 away from stop 73, and the adjusting-magnets 28 are thereby deënergized. This is done in order that the push-pins 30, actuated by said magnets, may have cleared the ends of the stops 2, which have not been pushed in, before the carrier 1 begins to rotate again. As will be seen, said push-pins are not pushed in to adjust the stops 2 until the stop-magnet 42 has opened the clutch 5, for it is not until said stop-magnet has operated that relay 69 operates. Therefore there can be no conflict between pins 30 and stops 2 when said pins are pressed in; but since stop-magnet 42 is deënergized the instant the finger-key which has been depressed is released and since the depression of said finger-key may continue for only a very brief instant and as soon as said key is released the clutch 5 closes and the drum 1 begins to rotate again it is very important that the adjusting-magnets 28 shall be deënergized and the pins 30 withdrawn before the stop-magnet 42 can by any possibility be deënergized, and this is accomplished by the relay 69, which in ordinary operation will have completed the circuit through the selected adjusting-magnets and then broken said circuit again before the depression of the finger-key is completed, the brief time during which the selecting-circuit is completed being nevertheless sufficient for the operation of the adjusting mechanism.

The operation of the transmitter shown in Figs. 1 to 8, inclusive, (the electrical or electromagnetic form of the transmitter,) is as follows: When one of the finger-keys is depressed, it depresses a corresponding combination of selecting-bails 34 and operates the corresponding selecting-contacts 38 39, and also closes master-contact 40, at the same time moving the indicating-wheel 58 one space. The master-contact 40, when completed, closes circuit through the clutch or stop magnet 42, thereby opening clutch 5 and arresting the motion of the carrier 1, and then closes circuit through contacts 54 55 and the relay 69, thus operating said relay and causing the same to close circuit momentarily through the selecting-contacts 38 39, which have been closed, and through the corresponding adjusting-magnets. Said magnets being thus energized attract their armatures, moving forward the corresponding push-pins 30 and pushing in the stops 2 opposite the ends of said pins at the instant. The adjusting-magnets are then deënergized and the push-pins are drawn back clear of the ends of the stops 2, which have not been pushed in. As soon as the finger-key which has been depressed is released master-contact 40 is broken, the stop-magnet 42 is deënergized, the clutch 5 is closed, and the drum 1 begins to rotate, the rocker 16, Figs. 1 and 3, of the transmitting-contact mechanism at the same time beginning to vibrate. As soon as, during an upward movement of the right-hand end of said rocker (as viewed in Fig. 1) a stop 2, which has been pressed in, comes opposite the controlling-pin 22 of the transmitting-contact mechanism said pin is permitted to rise, thus reversing contact-arm 7, closing contact at 9, and initiating a signal. During the next succeeding downward movement of the right-hand end of rocker 16 pin 22 will be depressed clear of the stops, and if the next succeeding stop has not been pressed in controlling-pin 23 will be permitted to rise, reversing contact-arm 7, closing contact at 10, and terminating the signal, which in such case is a dot; but if three i acent stops 2 have been pressed in pin 23 will not be permitted to rise, and the signal will continue until the fourth stop or any succeeding even-numbered stop (counting from that first mentioned) which has not been pressed in comes opposite said pin 23, whereupon said pin will rise and the contact-arm 7 will be moved into contact with stop 10, and the signal (which in such case will be a dash) will be terminated. As the drum rotates the ends of the stops which have been pushed in encounter the inclined surface of the resetting-cam 27 and are pressed back successively to their first position.

It will be seen that by pressing in various combinations of the stops 2 I may cause the transmitting-contact mechanism to produce various combinations of dots, dashes, and spaces, as required by telegraph-codes, and that these dots, dashes, and spaces may be of various lengths. It will be seen, further, that the transmitter is capable of extremely rapid operation. I do not limit myself to any particular type of transmitting-contact mechanism nor to transmitting mechanism of the pole-changing type; but I prefer to use contact mechanism, whether circuit-breaking or pole-changing, of the general type illustrated, which has been thoroughly tried out in actual practice and is well known to be durable and capable of great speed.

In order to overcome the effects of foreign currents on the line, earth-currents, &c., I preferably do not connect the transmitting-contact mechanism above described directly to the line, but cause it to operate a relay 74, as shown in Fig. 7, said relay being connected to the line as shown, so as to repeat therein the signals of the transmitting-contact mechanism, and having means for giving a bias to one side over the other. Such giving of bias is customarily accomplished by mounting the stops of the relay upon a plate, as 75, formed of insulating material or otherwise arranged to insulate the stops from each other and provided with means—as, for example, a worm 76—for moving the plate to one side or the other, so that in one extreme position the armature will be nearer its magnet-pole than in the opposite position.

Instead of employing electrical means, as above described, for adjusting the positions of the stops I may employ mechanical means for that purpose. Figs. 9, 10, and 11 illustrate such a transmitter. The general construction of the instrument is the same as that of the electrically-operated instrument above described, and where possible the same reference-numerals are employed. The construction of the drum 1 and the means by which it is driven are the same as above described; likewise the transmitting-contact mechanism and the general structure of the keyboard. The selecting-bails of this keyboard instead of operating contacts, as in the electrical form of transmitter, are connected by links 77 to bell-cranks 78. The upper arms of these bell-cranks are curved, as shown in Fig. 10, so that their ends are in an arc of a circle approximately concentric with the axis of drum 1, and these ends are connected to the push-pins, by which the stops 2 are pressed in. It will be apparent that the effect of these mechanical connections between the selecting-bails and the push-pins 30 is the same as that of the electrical connections shown in the previous figures. For actuating the clutch 5 and the locking device of the carrier 1 a master-bail 79, corresponding to bail 41 of Fig. 6, is provided. This bail actuates a lever 80, which has a yielding connection, through a spring 81, with a bell-crank 82, connected by link 44 with the clutch-operating and lock-operating lever 45. The effect of the elastic connection formed by the spring 81 is that as soon as a key-lever is depressed, and with it the bail 79, the spring 81, which is of sufficient stiffness to overcome the clutch-spring 48, communicates motion to lever 82 and clutch-and-lock lever 45, opening the clutch and stopping the drum 1. This occurs before any of the selecting-bails 34 have been depressed. As said key-lever is depressed further the appropriate selecting-bails 34 are depressed (the spring 81 compressing to permit further motion of the key-lever after locking tooth 50 has reached the limit of its movement) and the corresponding push-pins 30 are pressed in, pressing in the corresponding stops 2. When the finger-key is released, the push-pins 30 are first withdrawn and then the lever 82 is permitted to rise, the tooth 50 clearing the locking-disk 49 and the clutch 5 closing.

It is obvious that the mechanical means shown for adjusting the stops 2 by the action of key-levers is only one of many mechanisms which may be used for the purpose, and I do not limit myself to the particular mechanism shown.

Instead of causing the controlling fingers or pins 22 and 23 of the transmitting-contact mechanism to coact with the ends of the stops 2 I may employ stops, as shown in Fig. 12, having grooves 83, which when opposite the end of a pin 22 or 23 permit that pin to rise sufficiently to operate the transmitting-contact mechanism, or, as illustrated in Fig. 13, I may provide the stops with lugs 84, which when opposite a pin 22 or 23 will prevent that pin from rising. It will be obvious that still other ways of controlling the rise of the pins 22 and 23 by means of the adjustable stops may be employed.

It will be obvious that my improved keyboard-telegraph transmitter herein illustrated and described is susceptible of many variations and modifications without departing from the spirit and scope of my invention, and, further, that certain parts may be used in connection with other parts of different construction. I do not limit myself, therefore, to the particular details of construction, arrangement, and operation herein illustrated and described.

What I claim is—

1. In a telegraph-transmitter, the combination with a movable carrier, adjustable circuit-controlling devices carried thereby, and means for adjusting said devices variably according to the character to be transmitted, of contact mechanism comprising controlling members adapted to be vibrated but arranged to be controlled in such vibration by said circuit-controlling devices, driving means automatically operated adapted to vibrate said members, and contact means operated by the vibration of said members.

2. In a telegraph-transmitter, the combination with a movable carrier, adjustable circuit-controlling devices carried thereby, and a keyboard and means operated thereby for adjusting said devices variably according to the character to be transmitted, of contact mechanism comprising controlling members adapted to be vibrated but arranged to be controlled in such vibration by said circuit-controlling devices, driving means automatically operated adapted to vibrate said members, and contact means operated by the vibration of said members.

3. In a telegraph-transmitter, the combination with a movable carrier, adjustable circuit-controlling devices carried thereby, magnets and means operated thereby for adjusting said devices, and selecting means controlling said magnets, of contact mechanism comprising controlling members adapted to be vibrated but arranged to be controlled in such vibration by said circuit-controlling devices, means for vibrating said members, and contact means operated by the vibration of said members.

4. In a telegraph-transmitter, the combination with a movable carrier, adjustable circuit-controlling devices carried thereby, magnets and means operated thereby for adjusting said devices, and a keyboard comprising selecting means controlling said magnets, of contact mechanism comprising controlling members adapted to be vibrated but arranged to be controlled in such vibration by said circuit-controlling devices, means for vibrating said members, and contact means operated by the vibration of said members.

5. In a telegraph-transmitter, the combination with a movable carrier, adjustable circuit-controlling devices carried thereby, and means for adjusting said devices variably according to the character to be transmitted, of contact mechanism comprising controlling members adapted to be vibrated but arranged to be controlled in such vibration by said circuit-controlling devices, driving means automatically operated adapted to vibrate said members, contact means operated by the vibration of said members, and means for arresting said carrier during the adjustment of said circuit-controlling devices.

6. In a telegraph-transmitter, the combination with a movable carrier, adjustable circuit-controlling devices carried thereby, and a keyboard and means operated thereby for adjusting said devices variably according to the character to be transmitted, of contact mechanism comprising controlling members adapted to be vibrated but arranged to be controlled in such vibration by said circuit-controlling devices, driving means automatically operated adapted to vibrate said members, contact means operated by the vibration of said members, and means for arresting said carrier during the adjustment of said circuit-controlling devices.

7. In a telegraph-transmitter, the combination with a movable carrier, adjustable circuit-controlling devices carried thereby, magnets and means operated thereby for adjusting said devices, and selecting means controlling said magnets, of contact mechanism comprising controlling members adapted to be vibrated but arranged to be controlled in such vibration by said circuit-controlling devices, means for vibrating said members, contact means operated by the vibration of said members, and means for arresting said carrier during the adjustment of said circuit-controlling devices.

8. In a telegraph-transmitter, the combination with a movable carrier, adjustable circuit-controlling devices carried thereby, magnets and means operated thereby for adjusting said devices, and a keyboard comprising selecting means controlling said magnets, of contact mechanism comprising controlling members adapted to be vibrated but arranged to be controlled in such vibration by said circuit-controlling devices, means for vibrating said members, contact means operated by the vibration of said members, and means for arresting said carrier during the adjustment of said circuit-controlling devices.

9. In a telegraph-transmitter, the combination with a movable carrier, adjustable circuit-controlling devices carried thereby, operating mechanism for said carrier comprising means for driving said carrier intermittently, and means for adjusting said circuit-controlling devices arranged to adjust the same while the carrier is stationary, of contact mechanism comprising controlling members adapted to be vibrated but arranged to be controlled in such vibration by said circuit-controlling devices, means other than said circuit-controlling devices for vibrating said members, and contact means operated by the vibration of said members.

10. In a telegraph-transmitter, the combination with a movable carrier, adjustable circuit-controlling devices carried thereby, means comprising a clutch for driving said carrier, and a magnet and means operated thereby for opening said clutch, magnets and means operated thereby for adjusting said circuit-controlling devices, selecting means controlling said adjusting-magnets, and means operated by said clutch-magnet likewise controlling said adjusting-magnets and arranged to prevent the operation thereof until the clutch is open, of contact mechanism controlled by said circuit-controlling devices.

11. In a telegraph-transmitter, the combination with a movable carrier, adjustable circuit-controlling devices carried thereby, means comprising a clutch for driving said carrier, a magnet and means operated thereby for opening said clutch, adjusting-magnets and means operated thereby for adjusting said circuit-controlling devices, selecting means controlling said adjusting-magnets, and a relay controlled by said clutch-magnet having contact devices arranged to prevent the operation of said adjusting-magnets until after the clutch has opened and to cause said magnets to disengage their adjusting means from said circuit-controlling devices prior to the closing of said clutch, of contact mechanism controlled by said circuit-controlling devices.

12. In a telegraph-transmitter, the combination with a movable carrier, adjustable circuit-controlling devices carried thereby, means comprising a clutch for driving said carrier, a magnet and means operated thereby for opening said clutch, adjusting-magnets and means operated thereby for adjusting said circuit-controlling devices, selecting means controlling said adjusting-magnets, and a relay controlled by said clutch-magnet and having contact means arranged to close circuit through the selected adjusting-magnets upon the commencement of movement of its armature in one direction and to break said circuit prior to the completion of such movement, of contact mechanism controlled by said circuit-controlling devices.

13. In a telegraph-transmitter, the combination of a movable carrier, adjustable circuit-controlling devices carried thereby, magnets for adjusting said circuit-controlling devices, and a keyboard and means operated thereby controlling the circuits of said magnets.

14. In a telegraph-transmitter, the combination of a movable carrier, adjustable circuit-controlling devices carried thereby, magnets for adjusting said circuit-controlling devices, and a keyboard comprising selecting-contacts each corresponding to and controlling a circuit through one of said adjusting-magnets, and also comprising selecting means, differently operated by the different keys of said keyboard, operating said selecting-contacts.

15. In a telegraph-transmitter, the combination of a movable carrier, adjustable circuit-controlling devices carried thereby, magnets for adjusting said circuit-controlling devices, and a keyboard comprising selecting mechanism including contacts controlling the circuits of the several adjusting-magnets and a master-contact, closed by each key after the closing of the selecting-contacts operated thereby, said master-contact controlling the circuits of all said adjusting-magnets.

16. In a telegraph-transmitter, the combination of a movable carrier, adjustable circuit-controlling devices carried thereby, magnets for adjusting said circuit-controlling devices, a stop-magnet arranged when operated to arrest the movement of said carrier, a keyboard comprising selecting mechanism including contacts controlling the circuits of the several adjusting-magnets and a master-contact, closed by each key after the closing of the selecting-contacts operated thereby, said master-contact controlling said stop-magnet, and means operated by said stop-magnet controlling the circuits of all of said adjusting-magnets.

17. In a telegraph-transmitter, the combination of a movable carrier, adjustable circuit-controlling devices carried thereby, magnets for adjusting said circuit-controlling devices, a stop-magnet arranged when operated to arrest the movement of said carrier, a keyboard comprising selecting mechanism including contacts controlling the circuits of the several adjusting-magnets and a master-contact, closed by each key after the closing of the selecting-contacts operated thereby, said master-contact controlling said stop-magnet, and a relay operated by said stop-magnet having contact means arranged to close circuit through the selected adjusting-magnets upon the commencement of movement of its armature and to break such circuit prior to the completion of such movement.

18. In a telegraph-transmitter, the combination of a movable carrier, longitudinally-movable stops carried thereby, means for adjusting said stops, contact mechanism comprising controlling means having springs tending to press said controlling means against said stops, and means other than said stops for vibrating said controlling means.

19. In a telegraph-transmitter, the combination of a movable carrier, longitudinally-movable stops carried thereby, operating mechanism for said carrier comprising means for driving said carrier intermittently, means for adjusting said stops arranged to operate while said carrier is stationary, contact mechanism comprising controlling means having springs tending to press said controlling means against said stops, and means other than said stops for vibrating said controlling means.

20. In a telegraph-transmitter, the combination of a movable carrier, longitudinally-movable stops carried thereby, operating mechanism for said carrier comprising means for driving said carrier intermittently, means for adjusting said stops arranged to operate while said carrier is stationary, and contact mechanism comprising controlling - fingers spring-pressed toward said stops, means tending to vibrate said fingers toward and away from said stops in synchronism with the passage of the stops, and contact means operated by the vibration of said fingers.

21. In a telegraph-transmitter, the combination of a driving-shaft, a drum thereon, longitudinally-movable stops carried thereby, operating mechanism for said carrier comprising means for driving said shaft intermittently, means for adjusting said stops arranged to operate while the shaft is stationary, and contact mechanism comprising controlling-fingers spring-pressed toward said stops, means tending to vibrate said fingers toward and away from said stops in synchronism with the passage of the stops, and contact means operated by the vibration of said fingers.

22. In a telegraph-transmitter, the combination of a driving-shaft, a drum thereon, longitudinally-movable stops carried thereby, means for adjusting said stops, and contact mechanism comprising controlling-fingers spring-pressed toward said stops, means tending to vibrate said fingers toward and away from said stops in synchronism with the passage of the stops, and contact means operated by the vibration of said fingers.

23. In a telegraph-transmitter, the combination with a driving-shaft, a drum thereon, longitudinally-movable stops carried thereby, means for adjusting said stops, and contact mechanism comprising controlling-fingers spring-pressed toward said stops, one of said fingers arranged to be arrested in its movement by the opposite stop if said stop be in normal position, but to be free to move in case said stop has been adjusted, the other finger arranged to be unimpeded in its movement by said stops when the latter are in normal position, but to be arrested in its movement by the stop opposite it if such stop has been moved to its adjusted position, and contact means operated by the vibration of said fingers.

24. In a telegraph-transmitter, the combination with a moving carrier, circuit-controlling means carried thereby, and a clutch for driving said carrier, of a locking-wheel likewise driven by said clutch, means for opening said clutch and engaging said locking-wheel to lock the carrier, and a friction-drag tending to rotate the carrier while so locked.

25. In a telegraph-transmitter, the combination of a rotatably-mounted drum, longitudinally-movable stops carried thereby, radially-arranged adjusting-arms, push-pins operated thereby for moving said stops longitudinally, means for operating said arms, means guiding said push-pins, and means for resetting the stops.

26. In a telegraph-transmitter, the combination of a rotatably-mounted drum, longitudinally-movable stops carried thereby, adjusting-magnets arranged circularly about said drum, armature-levers therefor provided with means for moving said stops longitudinally, and means for resetting the stops.

27. In a telegraph-transmitter, the combination of a movably-mounted carrier, longitudinally-movable stops carried thereby, adjusting-magnets, armature-levers therefor provided with means for moving said stops longitudinally, means for resetting said stops, means for arresting the movement of the carrier, and a relay operated by said arresting means and having contact means controlling the circuits of said adjusting-magnets and arranged to complete such circuits, as to said contact means, upon the beginning of the movement of the armature of said relay, and to break such circuits prior to the completion of the movement of said armature.

28. In a telegraph-transmitter, the combination with a keyboard, transmitting-contact mechanism, and operating mechanism controlled by said keyboard and controlling the operation of said transmitting-contact mechanism, of a relay controlled by said transmitting-contact mechanism and provided with contact means arranged to repeat the signals of said contact mechanism into a line-circuit, said relay provided with means for giving bias.

In testimony whereof I affix my signature in the presence of two witnesses.

JOHN C. BARCLAY.

Witnesses:
FRANK KITTON,
C. A. VAN BRUNT.